Aug. 30, 1966  R. R. RUHNKE  3,269,553
HANG ROD ASSEMBLY
Filed Oct. 20, 1964
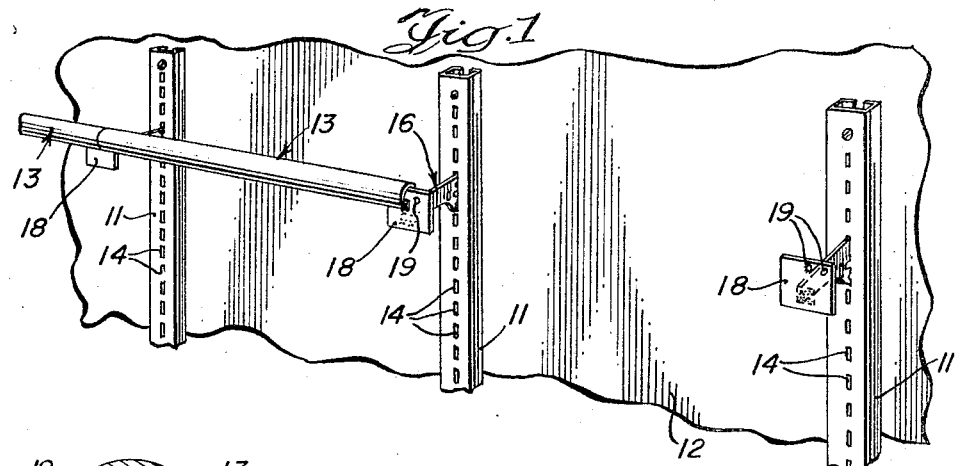
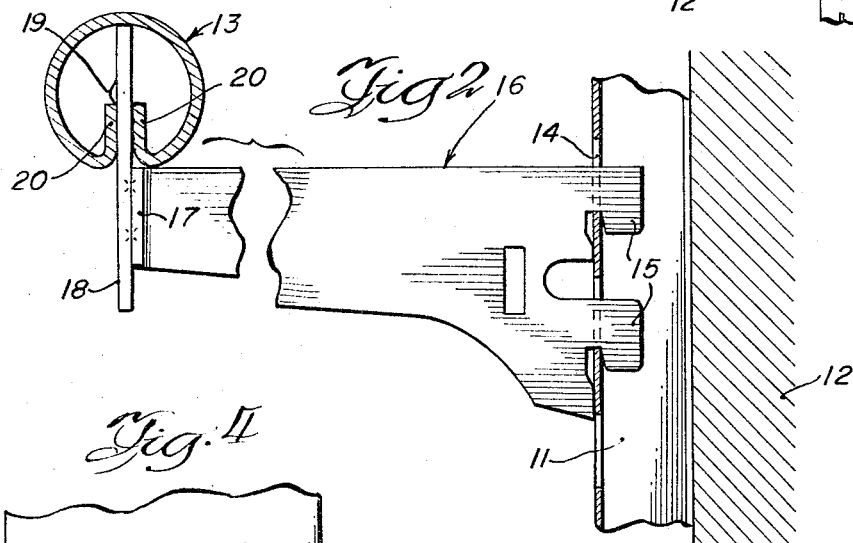
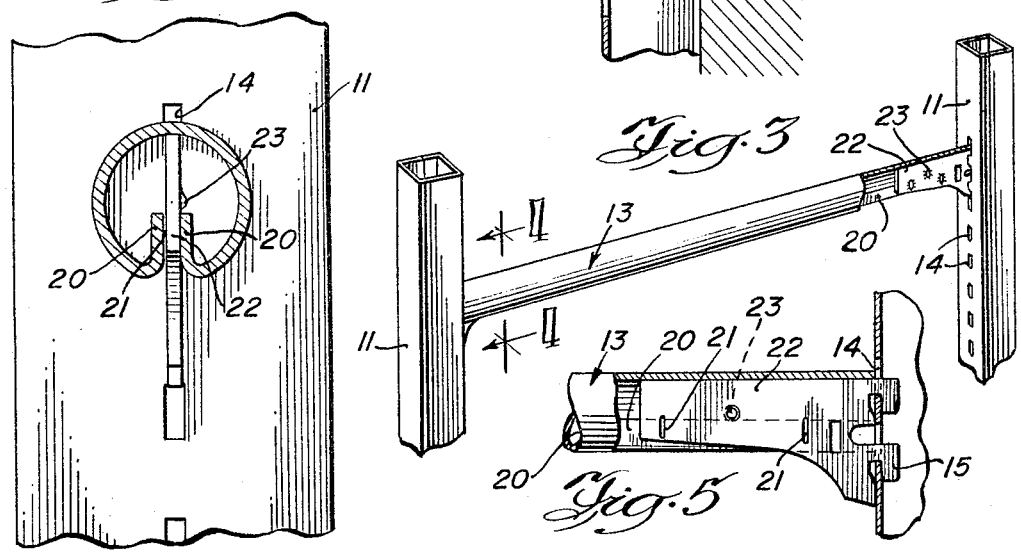
INVENTOR
Richard R. Ruhnke
By Dressler, Goldsmith, Clement, Gordon & Todd
ATTORNEYS Aug. 30, 1966 R. R. RUHNKE 3,269,553
HANG ROD ASSEMBLY
Filed Oct. 20, 1964 2 Sheets-Sheet 2
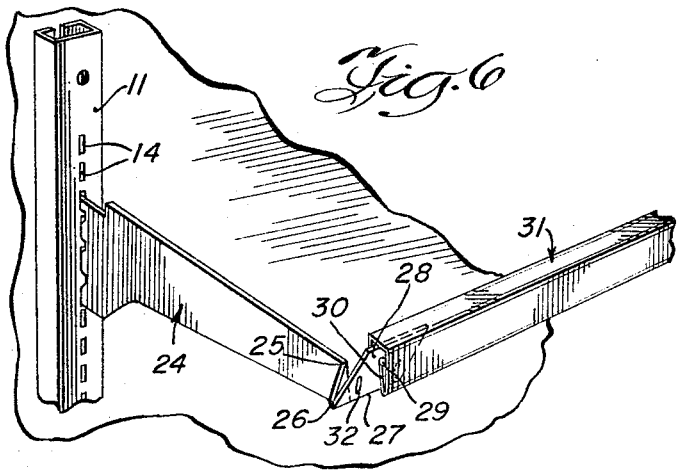
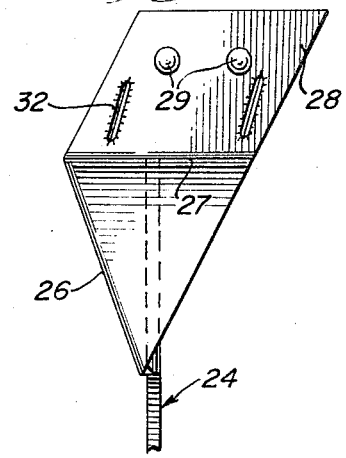
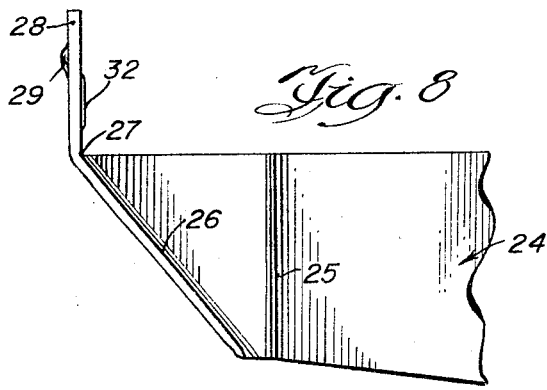
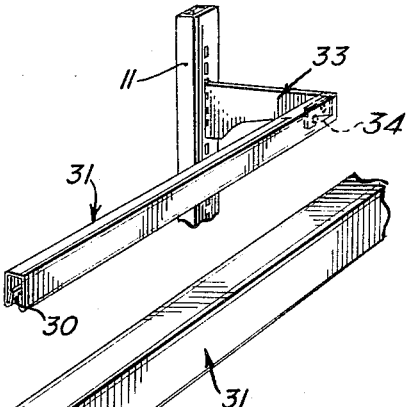
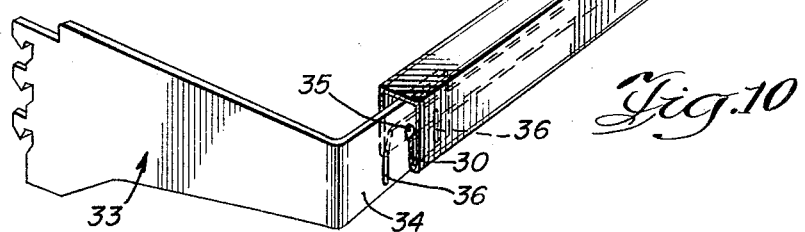
INVENTOR.
Richard R. Ruhnke
By Dressler, Goldsmith, Clement, Gordon & Lodd
ATTORNEYS.

United States Patent Office 3,269,553
Patented August 30, 1966

3,269,553
HANG ROD ASSEMBLY
Richard R. Ruhnke, Skokie, Ill., assignor to Garcy Corporation, a corporation of Illinois
Filed Oct. 20, 1964, Ser. No. 405,219
4 Claims. (Cl. 211—105.1)

This invention relates to a hang rod assembly, and is particularly concerned with a tubular hang rod and support brackets that may be assembled without tools to provide a rigid hang rod assembly of any desired length.

In accordance with the present invention, the tubular hang rods are fabricated in standard lengths, and each support bracket is provided with a flat plate section, either integral with the bracket or welded thereto, for rigidly holding hang rods hat are snapped into place. A hang rod may be mounted on the flat plate sections of a pair of spaced parallel support brackets to provide a hang rod assembly of unit length, or a plurality of hang rods may be mounted on the flat plate sections of a series of support brackets in end to end relationship to provide a hang rod assembly of any desired length. The interengagement of the support brackets with the hang rods provides a box-like support that eliminates side sway in the support brackets. The tubular hang rods may have any desired outer configuration, but each hang rod has a pair of integral resilient wall sections that are preferably parallel and are spaced to provide a tight frictional fit with the opposite surfaces of flat plate sections of a specified thickness.

In some embodiments of the invention, the flat plate section, upon which the hang rod is to be mounted, is integral with the support bracket. The tubular hang rods are uniform in size, and if the support bracket in such embodiment is thinner than the gap between the resilient wall sections of the hang rod, the bracket is provided with integral means that insure a tight frictional fit with the resilient wall sections of a tubular hang rod.

Structure by means of which the above mentioned and other advantages of the invention are attained will be fully described in the following specification, taken in conjunction with the accompanying drawings, showing four preferred illustrative embodiments of the invention, in which:

FIGURE 1 is a fragmentary perspective view of a hang rod assembly in which the hang rod extend at right angles to the plane of the support bracket, with one of the hang rods omitted to facilitate illustration of the structure;

FIG. 2 is an enlarged fragmenary cross-sectional view of the structure shown in FIG. 1;

FIG. 3 is a fragmentary perspective view of another embodiment showing a display rack of unit length, in which the hang rod extends parallel to the plane of the support brackets, with part of the hang rod broken away to facilitate illustration of the structure;

FIG. 4 is an enlarged cross-secinal view, taken along the line 4—4 of FIG. 3;

FIG. 5 is an enlarged fragmentary view of the right hand portion of FIG. 3 in which a portion of the hang rod is broken away;

FIG. 6 is a fragmentary perspective view of another embodiment in which the outer end of the support bracket is bent to provide a section extending upwardly above the upper edge of the bracket and at right angles thereto for holding the hang rod;

FIG. 7 is an end elevational view of the support bracket of FIG. 6;

FIG. 8 is a fragmentary side elevation view of the support bracket of FIG. 6;

FIG. 9 is a fragmentary perspective view of another embodiment showing a hang rod assembly of unit length in which the hang rod is mounted on adjacent support brackets having their ends turned toward each other in the same plane as said bracket; and FIG. 10 is a fragmentary perspective view similar to FIG. 9, but showing the opposite end of the hang rod assembly, and with a portion of the hang rod cut away.

In the drawings, conventional uprights 11 are secured to a wall surface 12 in parallel relationship and are spaced from each other a distance equal to a standard length of tubular hang rod 13. The uprights are each provided with a series of vertically spaced slots 14 adapted to receive the hook-shaped extensions 15 at the inner end of a support bracket 16. The above structure is common to all embodiments of the invention, and the description of said structure will not be repeated.

In FIGS. 1 and 2, the outer end of support bracket 16 is bent at right angles, to form a flange 17, and a flat plate section 18 is welded to said flange. The flat plate section is provided with one or two embossments 19. A single embossment 19 is enough if the flat plate section is to support only one hang rod, but two spaced embossments are required to support adjoining ends of hang rods when two or more hang rods are installed in end to end relationship.

The tubular hang rod 13 may have any desired outer configuration, and includes two resilient wall sections 20 that are preferably spaced apart a distance equal to the thickness of flat plate section 18 to enable them to engage the opposite surfaces of said flat plate section in tight frictional engagement. For economy in manufacture, the tubular hang rods are preferably uniform insofar as the spacing between the resilient wall sections is concerned. If the hang rod is to be mounted on a flat plate section that is an integral part of a thinner bracket, the bracket is provided on one side with a pair of spaced embossments 21 that engage one of the resilient wall sections, as shown in FIG. 4, to prevent any side sway between the resilient wall sections and the bracket. The upper edge of flat plate section 18 preferably extends above the upper edge of flange 17 to insure that brackets 16 will not interfere with the sliding movement of garment hangers along the top of hang rods 13.

The tubular hang rod is positioned above flat plate section 18 with the gap between resilient wall sections 20 in registration with the upper edge of said section. The tubular hang rod is then pressed downwardly onto the upper edge of the flat plate section. As one of the resilient wall sections engages embossment 19, it spreads outwardly from the other wall section until its upper edge passes over the embossment. The resilient wall sections snap into place with the free edge of one section engaging embossment 19. The interengagement of the free edge of a wall section 20 with embossment 19 prevents accidental movement of the hang rod transversely to the upper edge of flat plate section 18 in a direction to remove the hang rod from said flat plate section.

In FIGS. 3 to 5, two uprights 11 are set up with slots 14 of each upright facing each other. Support brackets 22 are secured by extensions 15 at the inner ends to the uprights in the same manner as in FIGS. 1 and 2. Brackets 22 extend toward each other in longitudinal alignment and are each provided with an embossment 23 which is an equivalent of embossment 19 in FIGS. 1 and 2. The hang rod 13 to be mounted on support brackets 22 is identical with the hang rod of FIGS. 1 and 2, and is mounted on brackets 22 in the same manner as the hang rod of FIGS. 1 and 2 is mounted on flat plate section 18. Embossments 21 are provided on one or both sides of bracket 22 when the bracket is thinner than the gap between resilient wall sections 20.

In the embodiment of FIGS. 3 to 5, the hang rod is mounted directly between uprights 11 instead of being spaced therefrom, as in FIGS. 1 and 2. Brackets 22 are preferably shortened to reduce the total amount of friction that must be overcome to snap the hang rod in place.

In the embodiment of FIGS. 6 to 8, a support bracket 24 has its inner end secured to an upright 11 in the same manner as in the embodiment of FIGS. 1 and 2. The outer end portion of support bracket 24 is bent along the lines 25, 26 and 27 to provide an integral flat plate section 28 that extends above the upper edge of the body portion of the support bracket. Flat plate section 28 is provided with an embossment 29, similar to embossments 19, to engage the free edge of a resilient wall section 30 extending inwardly of a tubular hang rod 31.

Hang rod 31 is shown as having a rectangular cross-sectional shape, but it will be understood that hang rods 13 and 31 are interchangeable. As in the embodiment of FIGS. 1 and 2, flat plate section 28 may have two embossments 29 if the brackets are to support a plurality of tubular hang rods in end to end relationship. If bracket 24 is too thin to engage both resilient wall sections 30 with a tight frictional fit, it is provided with a pair of spaced embossments 32 to compensate for the difference in thickness.

In the embodiment of FIGS. 9 and 10, a support bracket 33 has its inner end mounted in an upright 11, as in the other embodiments, and has its outer end bent at right angles to provide an integral flat plate section 34. A tubular hang rod 31 is mounted on a pair of flat plate sections 34 formed by bending the outer ends of two adjacent brackets in opposite directions. Plate section 34 is provided with an embossment 35 engageable with the free edge of tubular hang rod 31. Plate section 34 is also provided with a pair of spaced embossments 36 to insure a tight frictional engagement with resilient wall sections 30 of tubular rod 31 in cases in which bracket 33 is too thin to engage both resilient wall sections 30 of the tubular hang rod.

Although I have described four preferred embodiments of my invention in considerable detail, it will be understood that the description thereof is intended to be illustrative, rather than restrictive, as many details of structure may be modified or changed without departing from the spirit or scope of the invention. Accordingly, I do not desire to be restricted to the exact structure disclosed.

I claim:

1. A hang rod assembly comprising a support bracket and a tubular hang rod mounted on said support bracket, said support bracket having a flat plate section at one end thereof and mounting means on the other end, said flat plate section having an embossment projecting from one surface thereof in spaced relationship to its lower edge, said tubular hang rod having two resilient wall sections terminating within said hang rod and spaced to fit in tight frictional engagement with opposite surfaces of said flat plate section, the upper edge of the wall section adjacent said one surface engaging said embossment to hold said hang rod against movement transverse to the upper edge of said flat plate section in a direction to separate said hang rod from said flat plate section.

2. A hang rod assembly comprising a support bracket and a tubular hang rod mounted on said support bracket, said support bracket having one end portion bent to form a flat plate section and mounting means on the other end, said flat plate section having an embossment projecting from one surface thereof in spaced relationship to its lower edge, said tubular hang rod having two resilient wall sections terminating within said hang rod and spaced to fit in tight frictional engagement with opposite surfaces of said flat plate section, the upper edge of the wall section adjacent said one surface engaging said embossment to hold said hang rod against movement transverse to the upper edge of said flat plate section in a direction to separate said hang rod from said flat plate section.

3. A hang rod assembly comprising a support bracket and a tubular hang rod mounted on said support bracket, said support bracket having an upper edge defined by a straight line, one end portion of said bracket being bent to form a flat plate section extending transversely of said bracket and having an upper edge extending above the upper edge of the unbent portion of said bracket and mounting means on the other end of the bracket, said flat plate section having an embossment projecting from one surface thereof in spaced relationship to its lower edge, said tubular hang rod having two resilient wall sections terminating within said hang rod and spaced to fit in tight frictional engagement with opposite surfaces of said flat plate section, the upper edge of said flat plate section holding the uppermost surface of said hang rod above the upper edge of the unbent portion of said bracket, the upper edge of the wall section adjacent said first mentioned surface engaging said embossment to hold said hang rod against movement transverse to the upper edge of said flat plate section in a direction to separate said hang rod from said flat plate section.

4. A hang rod assembly comprising a support bracket and a tubular hang rod mounted on said support bracket, said support bracket having a flat plate section at one end thereof and mounting means on the other end, said flat plate section having an embossment projecting from one surface thereof in spaced relationship to its lower edge, said tubular hang rod having two resilient wall sections terminating within said hang rod and spaced apart a distance greater than the thickness of said flat plate section, said flat plate section having a second embossment in engagement with the outer surface of one of said resilient wall sections to provide a tight frictional engagement between said resilient wall sections and opposite surfaces of said flat plate section, the upper edge of the wall section adjacent said first mentioned surface engaging said first mentioned embossment to hold said hang rod against movement transverse to the upper edge of said flat plate section in a direction to separate said hang rod from said flat plate section.

References Cited by the Examiner

UNITED STATES PATENTS

| | | | |
|---|---|---|---|
| 1,089,550 | 3/1914 | Von Drak | 211—105.3 |
| 2,272,956 | 2/1942 | Stuber et al. | 248—264 |
| 2,710,695 | 6/1955 | Mazany | 211—105.3 |
| 2,911,242 | 11/1959 | Bickerstaff | 287—54 |
| 3,184,200 | 5/1965 | McDonnell | 248—240 |

CLAUDE A. LE ROY, *Primary Examiner.*

W. D. LOULAN, *Assistant Examiner.*